May 24, 1938.  J. FITZHUGH  2,118,464

HYDRAULIC TRANSMISSION

Original Filed Sept. 7, 1933  3 Sheets—Sheet 1

Inventor

John Fitzhugh

By Clarence A. O'Brien
Attorney

May 24, 1938.   J. FITZHUGH   2,118,464
HYDRAULIC TRANSMISSION
Original Filed Sept. 7, 1933   3 Sheets-Sheet 2

Inventor
John Fitzhugh

By Clarence A. O'Brien
Attorney

May 24, 1938.  J. FITZHUGH  2,118,464
HYDRAULIC TRANSMISSION
Original Filed Sept. 7, 1933  3 Sheets-Sheet 3
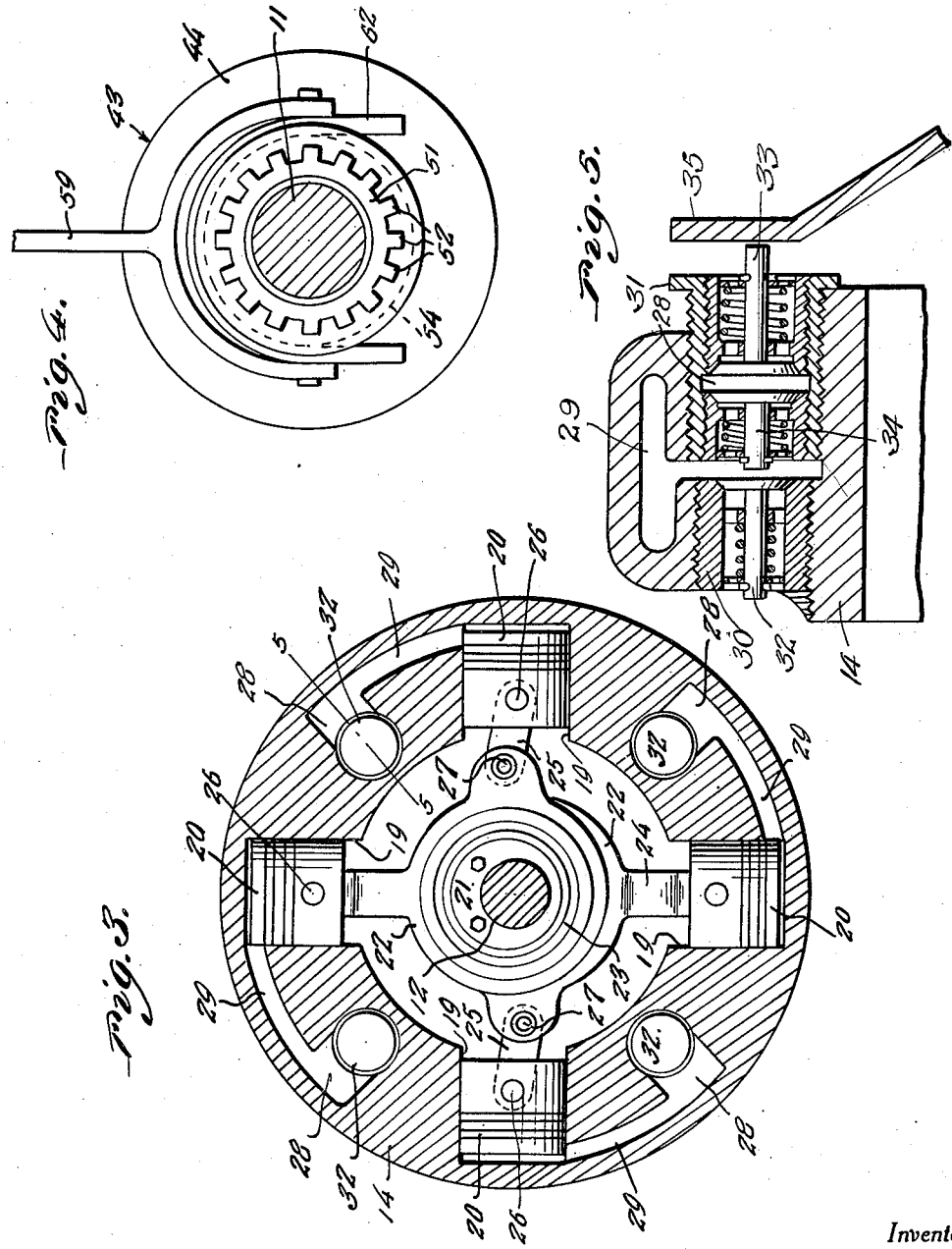
Inventor
John Fitzhugh
By Clarence A. O'Brien
Attorney Patented May 24, 1938

2,118,464

UNITED STATES PATENT OFFICE 2,118,464

HYDRAULIC TRANSMISSION

John Fitzhugh, Aberdeen, Wash., assignor of one-half to Frank Lange, Aberdeen, Wash.

Substitute for application Serial No. 688,514, September 7, 1933. This application July 16, 1936, Serial No. 91,011

2 Claims. (Cl. 74—189.5)

The present invention relates to a hydraulic transmission particularly for use on automobiles but it is understood, of course, that a transmission in accordance with the present invention may be used for any purpose or in any manner for which same may be found adapted and desirable.

An important object of the invention is to provide, in a manner as hereinafter set forth, a hydraulic transmission embodying a novel construction, combination and arrangement of parts through the medium of which a driven shaft may be rotated at any desired speed or rendered inoperative when desired.

Another important object of the invention is to provide a hydraulic transmission of the character described including a novel construction and arrangement of reversing mechanism by means of which the driven shaft may be selectively rotated at any desired speed in opposite directions.

Other objects of the invention are to provide a hydraulic transmission of the aforementioned character which will be simple in construction, strong, durable, efficient and reliable in operation and which may be manufactured and assembled at low cost.

All of the foregoing and still further objects and advantages of the invention will become apparent from a study of the following specification, taken in connection with the accompanying drawings, wherein like characters of reference designate corresponding parts throughout the several views, and wherein;

Figure 3 is a view in vertical cross section taken substantially on the line 3—3 of Figure 2 looking forwardly, as indicated by the arrows.

Figure 4 is a view in vertical cross section taken substantially on the line 4—4 of Figure 2, looking rearwardly, as indicated by the arrows.

Figure 5 is a detail view in vertical longitudinal section through one of the valve units.

Figure 1:
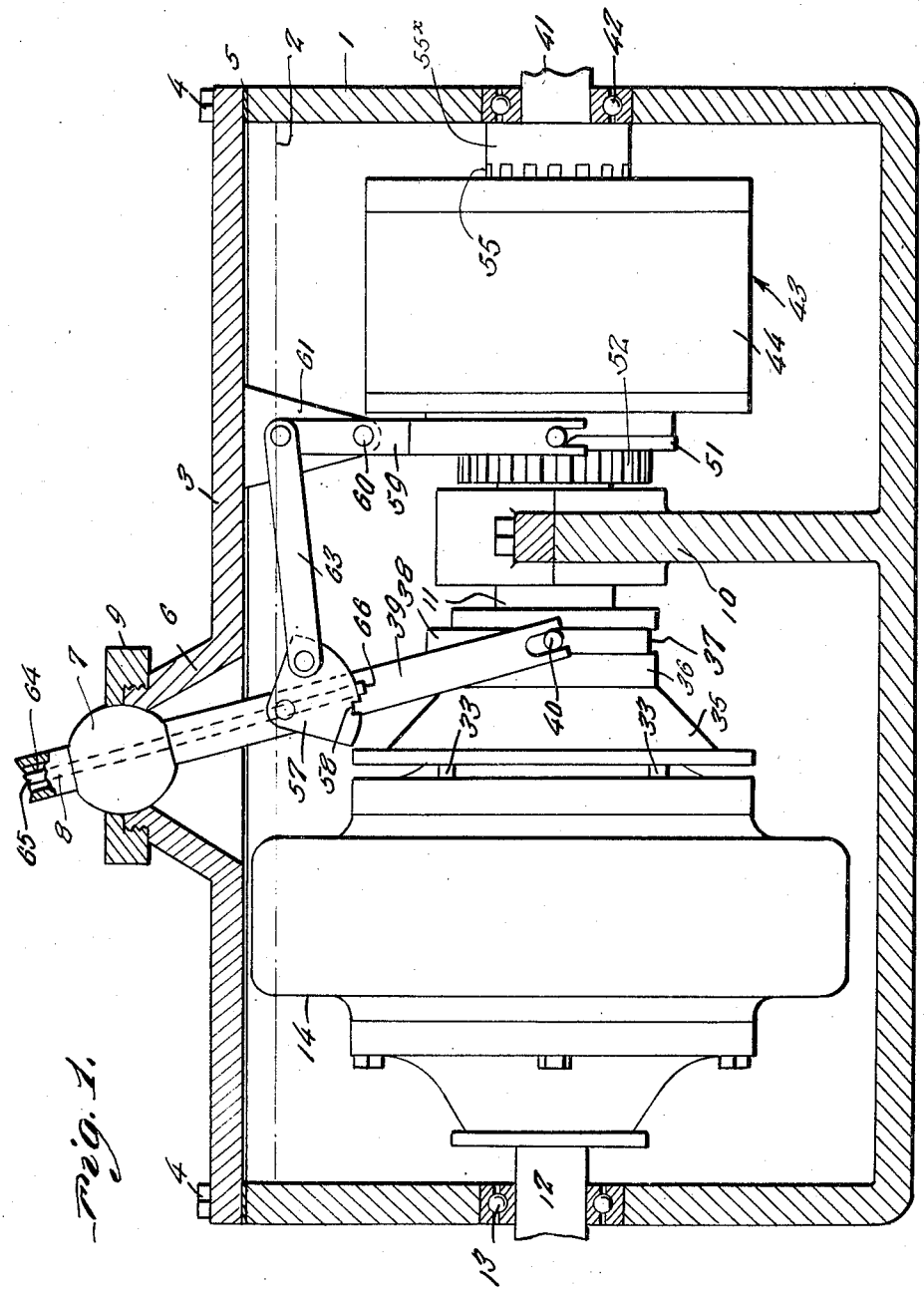
Figure 1 is a view in vertical longitudinal section through the transmission housing showing, in side elevation, the transmission mechanism mounted in said housing.

Referring now to the drawings in detail, it will be seen that the hydraulic transmission constituting the present invention comprises a housing I for the reception of lubricating oil approximately to the level indicated by the broken line 2. The top of the housing I is closed by a cover 3 which is removably secured in place by the elements 4. A gasket 5 is disposed between the housing I and the cover 3. At an intermediate point the cover 3 is formed with a raised portion 6 in the top of which the ball 7 of a lever 8 is rotatably retained by a cap 9 which is threaded on the upper end portion of said raised portion 6. Thus, it will be seen that the lever 8 extends for swinging movement downwardly into the housing I.

An upstanding bearing 10 is provided in an intermediate portion of the housing I and journaled therein is an intermediate shaft 11 having a bore 11' extending a distance thereinto from its forward end for rotatably receiving the rear end portion of the shaft 12. The shaft 12 extends rotatably through the forward end of the housing I in a bearing 13 and is connected directly to the crank shaft of the engine (not shown) of the automobile.

Figure 2:
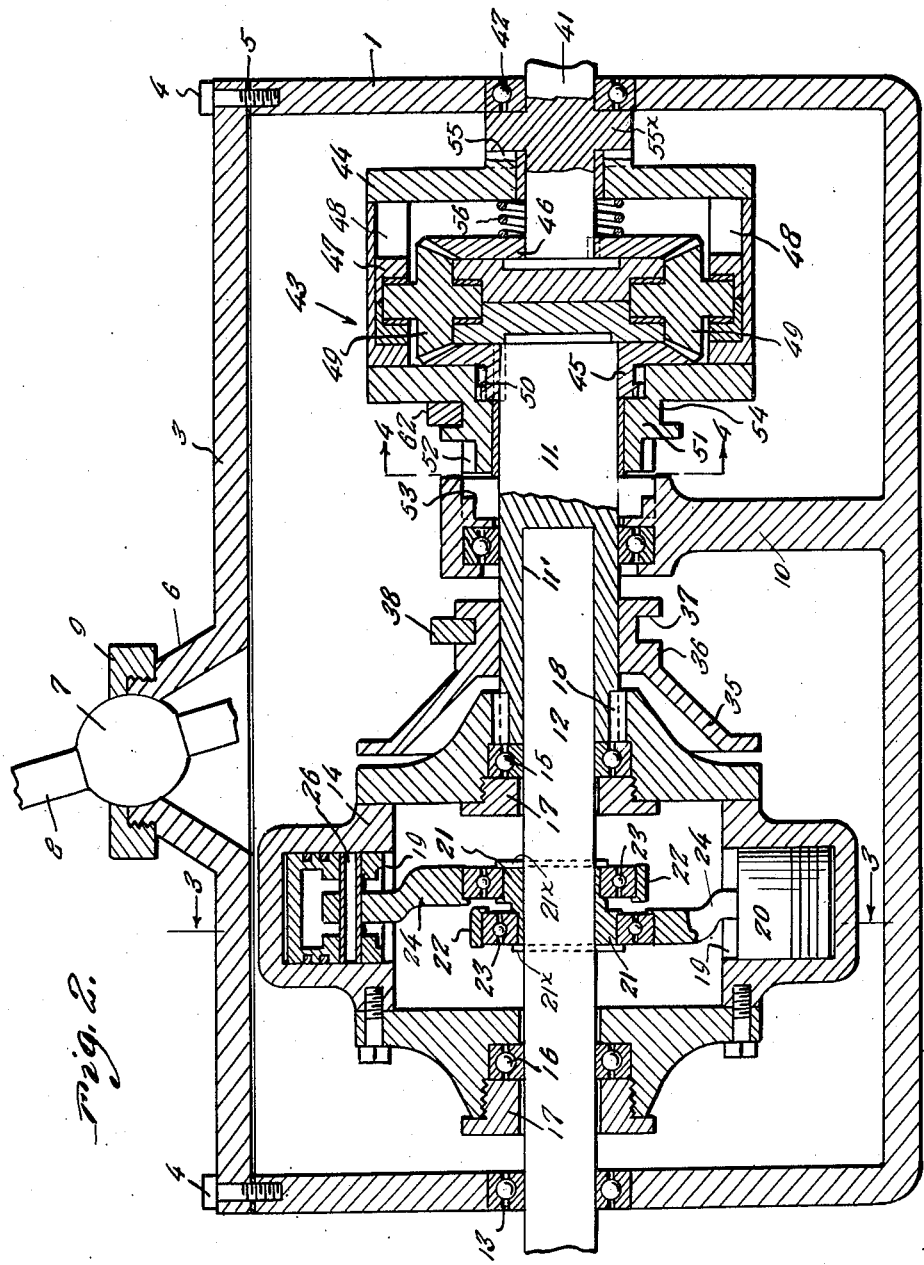
Figure 2 is a view in vertical longitudinal section through the transmission housing and mechanism.

An annular cylinder block 14 is rotatably mounted on the shaft 12 in the housing I, bearings 15 and 16 being provided for said annular block. The rear bearing 15 is disposed immediately adjacent the forward end of the intermediate shaft 11. Retainers 17 are threaded into the block 14 for maintaining the bearings 15 and 16 in position in the recesses provided therefor in the block. The forward end portion of the shaft 11 extends into the rear end portion of the block 14 and is keyed thereto, as at 18, the keys being shown in Figure 2 as disclosed partly in the shaft and partly in the block 14.

The annular block 14 has formed therein the radial cylinders 19 in which pistons 20 are disposed for reciprocation. Oppositely disposed eccentrics 21 are fixed by pins 21x on the shaft 12 within the annular block 14, said eccentrics preferably being integral with each other. Rings 22 are rotatably mounted on the eccentrics 21, bearings 23 being provided for said rings. Each of the rings 22 is connected with pistons 20 through the medium of rigid arms 24 preferably formed integrally with said ring. The other pistons 20 are connected, each with a ring 22, by the connecting rods or links 25. The pistons 20 are, of course, provided with wrist pins 26 with which the outer ends of the arms 24 and connecting rods 25 are connected for swinging movement. The inner ends of the connecting rods 25 are pivotally connected to their respective rings 22 as at 27. Between the cylinders 19 in the block 14 are provided the valve chambers 28 which communicate with the outer end portions of the cylinders 19 through the passages 29 and each chamber is in communication with the housing I. As best seen in Figure 5 of the drawings, valve cages 30 and 31 are threaded into the chambers 28 from the front and rear respectively of the block 14. A spring seated intake valve 32 is operatively mounted in each of the cages 30. A spring seated exhaust valve 33 is operatively mounted in each of the cages 31, the stems of said valve 33 projecting rearwardly from the cage 31. Also mounted in the cage 31 inwardly of the valve 33 is a spring seated check valve 34.

It will be noted from Figure 5 that the clearance shown between valves 34 and 33 is a limited one, but manifestly the said clearance may be of a degree to permit free flow of liquid past the valves 34 and 33 when the valve 33 is unseated by the plate 35 and the shaft 12 is rotated at a considerable speed.

A plate 35 is slidably mounted on the shaft 11 rearwardly of the annular block 14 and is operatively engageable with the valves 33 for unseating same. The hub portion 36 of the plate 35 is provided with a circumferential groove 37 for the reception of a yoke 38 with which the forked lower end portion 39 of the lever 8 is operatively connected through the medium of a pin and slot connection 40.

The reference numeral 41 designates a driven shaft which extends rotatably into the housing 1 through the rear end thereof in a bearing 42. The shafts 11, 12, and 41 are longitudinally alined in the housing 1. The reference numeral 43 designates generally a reversing unit through the medium of which the driven shaft 41 may be operatively connected to the shaft 11 for actuation thereby in either direction.

The reversing unit 43 comprises a casing 44 which is slidably and rotatably mounted on the shafts 11 and 41. Beveled gears 45 and 46 are fixed on the adjacent end portions of the shafts 11 and 41, respectively. A spider 47 of suitable construction is mounted in the casing 44 for rotation therewith and is slidable longitudinally in the recesses 48 provided therefor in the inner periphery of the casing 44. Beveled gears 49 are rotatably mounted in the spider 47 and are constantly in mesh, on diametrically opposite sides, with the gears 45 and 46. The casing 44 and the hub portion of the gear 45 are provided with conventional coacting clutch teeth 50 for causing rotation of the casing 44 with the gear 45 and the shaft 11 when said casing is disposed in its rearward position.

Formed integrally with the forward end of the casing 44 is an extension 51 having clutch teeth 52 thereon for engagement with internal clutch teeth 53 formed in the casting supported by the bearing 10. The extension 51 is further provided with a circumferential groove 54.

The driven shaft 41 and the rear end of the casing 44 are provided with conventional coacting clutch teeth 55 for positively connecting the driven shaft 41 to said casing 44 for actuation thereby when the casing is in its rearward position; the clutch teeth complementary to the driven shaft 41 being carried by a flange 55x on said shaft 41. A coil spring 56 encircles the shaft 41 within the casing 44 and is engaged with said casing for yieldingly urging same rearwardly.

Pivotally mounted for swinging movement on the lever 8 within the housing 1 is a segment 57 having a notch 58 therein. A fork 59 is mounted for swinging movement, as at 60, on a bracket 61 provided therefor in the housing 1. The fork 59 is operatively connected to the casing 44 through the medium of a yoke 62 which is engaged in the groove 54. The fork 59 is operatively connected to the segment 57 by a link 63.

The lever 8 is provided with a passage 64 in which is operable a manually actuated latch 65 having an angularly disposed lower end portion 66 projecting laterally from the lever 8 for engagement in the notch 58 of the segment 57. The latch 65 is reciprocable in the passage 64 of the lever 8.

In operation, when the shaft 12 is rotating, the pistons 20 are reciprocated in the cylinders 19 and oil is drawn into said cylinders from the housing 1 through the intake valves 32. If the lever 8 is actuated to move the plate 35 forwardly to unseat the exhaust valves 33, the oil which has been drawn into the cylinders 19 may be exhausted therefrom, thereby permitting the block 14 to remain stationary. However, if the exhaust valves 33 are closed, or partially closed, the pistons 20 will be oil bound in the cylinders 19 or partially so, and the block 14 will be caused to rotate at a speed depending on the position of the exhaust valves. Rotation of the annular block 14 also rotates the intermediate shaft 11. When the casing 44 is in its rearward position it constitutes means for connecting the driven shaft 41 directly to the intermediate shaft 11 for actuation thereby in the same direction in which said driven shaft is rotating.

When it is desired that the driven shaft 41 rotate in a direction opposite to that in which the intermediate shaft 11 is rotating, the lever 8 is actuated to move the plate 35 forwardly to fully open the exhaust valves 33. This movement of the lever 8 disposes the lower end portion 66 of the latch 65 in a position for engagement in the notch 58 of the segment 57 thereby locking said segment to the lever 8 against swinging movement. Then, as the lower end portion of the lever 8 is swung rearwardly to permit closing of the exhaust valves 33, the casing 44 is shifted forwardly against the tension of the coil spring 56 through the medium of the fork 59 and the links 63 thereby unclutching teeth 50. This frees the casing 44 from the beveled gear 45 and the driven shaft 41 and engages the clutch teeth 52 on the extension 51 with the clutch teeth 53, thereby positively retaining the casing 44 against rotation. Then, the beveled gear 45 rotates the beveled gear 46, and consequently the driven shaft 41 in a direction opposite to that in which the shaft 11 is rotating through the medium of the gears 49.

It is believed that the many advantages of a transmission in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

The invention constituting the subject of this application is the same as that disclosed in my prior application Serial No. 688,514, filed September 7, 1933.

What is claimed is:—

1. The improvement in a fluid clutch and reverse gearing organized mechanism which comprises a housing for the reception of a fluid, a driving shaft extending rotatably into the housing, a driven shaft extending rotatably into the housing, an intermediate shaft rotatably mounted in the housing, said shafts being longitudinally alined, fluid controlled means for connecting the intermediate shaft to the driving shaft for actuation at various speeds thereby, means operatively connecting the driven shaft to the intermediate shaft for actuation thereby selectively in opposite directions, such means including a housing slidably and rotatably arranged on the intermediate and driven shafts, a lever mounted for swinging movement and extending into the housing, means operatively connecting the lever to the fluid controlled means for regulating the same, a fork pivoted in the first mentioned housing and connected with the second housing, a link connected with the fork, means for swingingly connecting the link with the lever and manually operated latch means carried by the lever for holding the swinging connecting means against movement when the latch means is in operative position.

2. The improvement in a fluid clutch and reverse gearing organized mechanism which comprises a housing for the reception of a fluid, a driving shaft extending rotatably into the housing, a driven shaft extending rotatably into the housing, an intermediate shaft rotatably mounted in the housing, said shafts being longitudinally alined, fluid controlled means for connecting the intermediate shaft to the driving shaft for actuation at various speeds thereby, means operatively connecting the driven shaft to the intermediate shaft for actuation thereby selectively in opposite directions, a lever mounted for swinging movement and extending into the housing, means operatively connecting the lever to the fluid controlled means for regulating the same, a segment mounted for swinging movement on the lever, a fork mounted for swinging movement in the housing and operatively connected with the second named means, a link operatively connecting the fork with the segment and a manually operated latch carried by the lever and engageable with the segment for retaining said segment against swinging movement relative to the lever, said latch only being engageable with the segment when the lever is in a position for releasing the intermediate shaft from the driving shaft.

JOHN FITZHUGH.